(12) United States Patent
Yamazaki et al.

(10) Patent No.: US 8,385,842 B2
(45) Date of Patent: Feb. 26, 2013

(54) WIRELESS COMMUNICATION TERMINAL AND COMMUNICATION SYSTEM SELECTION METHOD

(75) Inventors: Kosuke Yamazaki, Fujimino (JP); Issei Kanno, Fujimino (JP)

(73) Assignee: KDDI Corporation, Tokyo (JP)

( * ) Notice: Subject to any disclaimer, the term of this patent is extended or adjusted under 35 U.S.C. 154(b) by 434 days.

(21) Appl. No.: 12/711,104

(22) Filed: Feb. 23, 2010

(65) Prior Publication Data

US 2010/0248646 A1 Sep. 30, 2010

(30) Foreign Application Priority Data

Mar. 31, 2009 (JP) ................................ 2009-087336

(51) Int. Cl.
*H04B 1/38* (2006.01)

(52) U.S. Cl. ..... 455/73; 455/418; 455/552.1; 455/552.2; 455/448; 455/454; 455/574; 455/127.1; 455/343.2; 455/343.4; 455/13.4

(58) Field of Classification Search .................. None
See application file for complete search history.

(56) References Cited

U.S. PATENT DOCUMENTS

| | | | |
|---|---|---|---|
| 7,941,179 B2 * | 5/2011 | Rofougaran et al. | 455/553.1 |
| 2006/0199608 A1 * | 9/2006 | Dunn et al. | 455/552.1 |
| 2006/0199698 A1 * | 9/2006 | Eriksson et al. | 477/92 |
| 2009/0135760 A1 | 5/2009 | Urushihara et al. | |
| 2009/0312005 A1 * | 12/2009 | Mukundan et al. | 455/422.1 |
| 2010/0178900 A1 * | 7/2010 | Cheng et al. | 455/414.1 |
| 2012/0108224 A1 * | 5/2012 | Cheng et al. | 455/418 |

FOREIGN PATENT DOCUMENTS

| | | |
|---|---|---|
| JP | 2007-116672 | 5/2007 |
| JP | 2008-011452 | 1/2008 |

* cited by examiner

*Primary Examiner* — Fayyaz Alam
*Assistant Examiner* — Mohammed Rachedine
(74) *Attorney, Agent, or Firm* — Mitchell P. Brook; McKenna Long & Aldridge LLP

(57) ABSTRACT

Provided are a wireless communication terminal that can select a power-efficient wireless communication system while keeping a data rate at a fixed level, and a communication system selection method. A wireless communication terminal is designed to be able to operate selectively according to a plurality of communication systems, and is configured to include: a required data rate calculation section that calculates a required data rate as a data rate needed to be satisfied in accordance with a remaining level of power and a communication history; and a communication system selection section that selects which communication system to be used through a comparison between a data rate of each of the communication systems to be determined based on a measured quality of communication service, and the calculated required data rate. This accordingly enables to select a power-efficient communication system while keeping a data rate at a standard level determined by a remaining level of power and a communication history. For example, the communication system can be used adaptively depending on the remaining level of battery, i.e., when the remaining level of battery is high, selected will be a communication system with a high data rate, and when the remaining level of battery is low, selected will be a communication system with a low data rate.

9 Claims, 4 Drawing Sheets

FIG. 3

| COMMUNI-CATION SYSTEM | CINR [db] | DATA RATE [Mbps] | POWER CONSUMPTION [mW] | POWER CONSUMPTION PER TRAFFIC AMOUNT [Ws/d] |
|---|---|---|---|---|
| EV-DO | -4.0 | 307.2 | 50 | $1.6276 \times 10^{-7}$ |
| | -1.0 | 614.4 | 70 | $1.13932 \times 10^{-7}$ |
| | 3.0 | 1228.8 | 110 | $8.95182 \times 10^{-8}$ |
| | 9.5 | 2457.6 | 200 | $8.13802 \times 10^{-8}$ |
| WiMAX | 0 | 1 | 300 | $3.0 \times 10^{-7}$ |
| | 5.0 | 10 | 1500 | $1.5 \times 10^{-7}$ |
| | 9.5 | 20 | 2400 | $1.5 \times 10^{-7}$ |

WIRELESS COMMUNICATION TERMINAL AND COMMUNICATION SYSTEM SELECTION METHOD

BACKGROUND OF THE INVENTION

1. Field of the Invention

The present invention relates to a wireless communication terminal capable of selecting an optimum communication system from a plurality of communication systems, and a communication system selection method for selecting an optimum communication system.

2. Description of Related Art

There has been known a multi-mode terminal that selectively adopts a plurality of wireless communication systems. With use of such a multi-mode terminal, the same terminal can be used for communication in areas different in wireless communication system. In any area where a plurality of wireless communication systems are available, the multi-mode terminal selects any optimum system for communication.

For example, a multi-mode wireless communication device disclosed in JP-A-2007-116672 refers to, in selection of the communication system, a switching power needed for switching communication systems, and a power consumption required for communication in each of the communication systems. Numerical values of such switching power and power consumption are stored in advance as coefficients in a separately-provided storage section. The numerical values of the power consumption are stored as the power consumption per unit time, and such values are multiplied by the communication time for use as evaluation values.

Also, a communication terminal device disclosed in JP-A-2008-11452 uses power consumption information that is managed in detail in a power value management table, in switching the communication systems. The power value management table manages various values of power, e.g., power on standby, power for a voice call, communication speed and power for packet communication, power of an RF section during control over power for transmission, power of the RF section and that of a baseband section during intermittent reception, and power associated with audio encoding. Such information helps to select the most power-efficient communication system according to the circumstances.

with use of the technologies disclosed in the above Patent Documents, the most power-efficient communication system can be selected at each stage. However, in such technologies, there is no provision of an evaluation value related to a data rate that can be implemented by each of the communication systems. In this sense, even if the selected communication system is power efficient, the communication system may not satisfy requirements in view of capabilities in some cases. Moreover, as not giving consideration to information about the remaining level of battery, the above technologies are not ready for a case of applying a high data rate even if the power supply is ample, and even if the power consumption is increased.

When the a multi-mode terminal selects any optimum wireless communication system, a data rate serves as a significant indicator in addition to the power consumption of each of wireless communication systems available for use. For example, reserving a wide range in a high frequency band enables higher-speed wireless communication, however, an extreme increase of the power consumption is not considered preferable. On the other hand, reducing the data rate can indeed reduce the power consumption, but this fails to ensure a required level of data rate, thereby possibly resulting in a failure of services or an increase of the eventual power consumption due to the communication forced to be very long.

The invention is proposed in consideration of such circumstances, and an object thereof is to provide a wireless communication terminal that can select a power-efficient wireless communication system while keeping a data rate at a standard level determined by the remaining level of power and a communication history, and a communication system selection method.

BRIEF SUMMARY OF THE INVENTION

According to the present invention, there is provided a wireless communication terminal that can select one of communication systems, the wireless communication terminal including a required data rate calculation section that calculates a required data rate as a data rate to be satisfied in accordance with the remaining level of power and a communication history, and a communication system selection section that selects a communication system to be used through a comparison between a data rate of each of the communication systems to be determined based on a measured quality of communication service, and the calculated required data rate.

As such, the wireless communication terminal of the invention calculates the required data rate in accordance with the remaining level of power. As a result, a power-efficient wireless communication system can be selected while keeping a data rate at a standard level determined by the remaining level of power and the communication history. For example, the communication system can be used adaptively depending on the remaining level of battery, i.e., when the remaining level of battery is high, a communication system with a high data rate is selected, and when the remaining level of battery is low, a communication system with a low data rate is selected.

BRIEF DESCRIPTION OF THE SEVERAL VIEWS OF THE DRAWINGS

FIG. 3 is a table showing a data rate and a power consumption with respect to the quality of communication service.

DETAILED DESCRIPTION OF THE INVENTION

Figure 1:
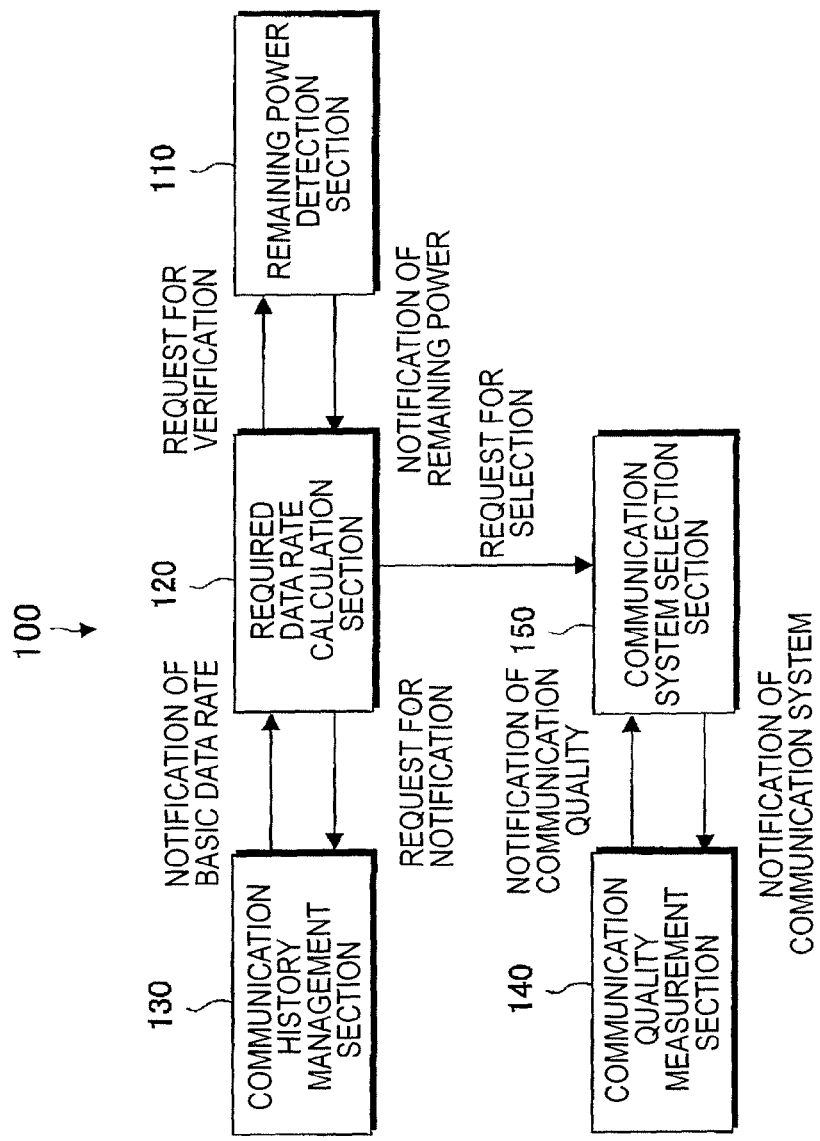
FIG. 1 is a block diagram showing the configuration of a wireless communication terminal of the invention.

A wireless communication terminal of an embodiment can select one of communication systems, and includes a required data rate calculation section that calculates a required data rate as a data rate to be satisfied in accordance with the remaining level of power and a communication history, and a communication system selection section that selects a communication system to be used through a comparison between a data rate of each of the communication systems to be determined based on a measured quality of communication service, and the calculated required data rate.

As such, the wireless communication terminal of the invention calculates the required data rate in accordance with the remaining level of power. As a result, a power-efficient wireless communication system can be selected while a data rate is kept at a standard level determined by the remaining level of power and the communication history. For example, the communication system can be adaptively used depending on the remaining level of battery, i.e., when the remaining level of battery is high, a communication system with a high data rate is selected, and when the remaining level of battery is low, a communication system with a low data rate is selected.

In the wireless communication terminal of the embodiment, the required data rate calculation section calculating the required data rate as an increasing function of the remaining level of power. Accordingly, the required data rate is reduced with a reduction of the remaining level of power, thereby allowing a selection of a communication system low in power consumption.

Also, in the wireless communication terminal of the embodiment, as for the data rate determined for each of the communication systems in accordance with the measured quality of communication service, when there is any communication system of a data rate equal to or higher than the calculated required data rate, the communication system selection section makes a selection of communication system therefrom. Accordingly, first of all, the data rate is checked to see whether it is satisfying the required data rate or not, and thus any communication system that satisfy the required data rate can be selected for use with a priority.

Also in the wireless communication terminal of the embodiment, when any one specific communication system cannot be determined even through a comparison between the data rate of each of the communication systems determined based on the measured quality of communication service and the calculated required data rate, the communication system selection section selects a communication system to be used on the basis of the power consumption per traffic amount. As a result, the communication system to be used can be selected on the basis of the power consumption per traffic amount, and power can be saved while keeping a data rate at a required level as much as possible.

Also, in the wireless communication terminal of the embodiment, the required data rate calculation section calculates the required data rate by referring to the data rate at a predetermined cumulative probability by using a cumulative probability distribution of the data rate obtained by a user's communication history. As a result, the required data rate is adjusted to be appropriate by referring to the user's history, thereby allowing a selection of communication system suitably for each user.

Also, in the wireless communication terminal of the embodiment, the required data rate calculation section calculates the required data rate as a product of a basic data rate and a safety coefficient. The basic data rate is set in accordance with the user's communication history, and the safety coefficient is an increasing function of the remaining level of power. Accordingly, the required data rate can be calculated respectively in accordance with the communication history and the remaining level of power.

A communication system selection method of the embodiment selects any optimum communication system, and includes steps of calculating a required data rate as a data rate be satisfied in accordance with the remaining level of power and a communication history, and selecting a communication system to be used through a comparison between a data rate of each of the communication systems to be determined based on a measured quality of communication service, and the calculated required data rate. As a result, a communication system small in power consumption can be selected while the data rate is kept at a standard level determined by the remaining level of power and the communication history.

According to the embodiment, the wireless communication system small in power consumption can be selected while keeping the standard data rate determined based on the remaining level of power and the communication history.

Now, a description will be given of an embodiment of the invention with reference to the accompanying drawings.

Configuration of Wireless Communication Terminal

FIG. 1 is a block diagram showing the configuration of a wireless communication terminal 100. The wireless communication terminal 100 is a so-called multi-mode terminal that can selectively use a plurality of communication systems. As shown in FIG. 1, the wireless communication terminal 100 is configured to include a remaining power detection section 110, a required data rate calculation section 120, a communication history management section 130, a quality of communication service measurement section 140, and a communication system selection section 150.

The remaining power detection section 110 detects the remaining level of power in response to a request coming from the required data rate calculation section 120, and calculates a remaining power ratio B(t). The remaining power detection section 110 then notifies the required data rate calculation section 120 of the remaining power ratio B(t). The remaining power ratio B(t) is a ratio of a detected value of the remaining level of power to the remaining level of power when the wireless communication terminal 100 is fully charged, i.e., 100%.

The required data rate calculation section 120 calculates a required data rate DRreq(t) in accordance with the remaining power ratio B(t) and the communication history as a data rate to be satisfied by the wireless communication terminal 100. During the calculation, the required data rate is also calculated as an increasing function of the remaining power ratio B(t). As a result, the required data rate is reduced with a reduction of the remaining level of power, thereby enabling a power-efficient communication system to be selected.

The required data rate calculation section 120 can also calculate the required data rate as a product of a basic data rate DRbased(t) and a safety coefficient SF(t). The basic data rate DRbased(t) is set in accordance with a user's communication history, for example, and the safety coefficient SF(t) is an increasing function of the remaining level of power. The required data rate calculation section 120 asks the communication history management section 130 to notify the basic data rate thereto, and asks the remaining power detection section 110 to notify the remaining power ratio B(t) thereto. As such, the required data rate calculation section 120 calculates a required data rate DRreq(t) using the basic data rate and the notified remaining power ratio B(t). The required data rate will be described later with a specific example thereof. Note here that the safety coefficient SF(t) takes a value of 1 or larger.

The communication history management section 130 manages the user's communication history, and notifies the basic data rate, i.e., DRbased(t), completed with revision based on the data rate that has been used before. The user's communication history includes a cumulative probability distribution of the data rate, and others. The cumulative probability distribution of the data rate will be described later as an example of using the communication history.

The quality of communication service measurement section 140 measures the quality of communication service of each of the communication systems. When a request comes from the communication system selection section 150, the quality of communication service measurement section 140 notifies the communication system selection section 150 of the quality of communication service. Indicators of the quality of communication service include RSSI (Receive Signal Strength Indicator), CINR (Carrier to Interference and Noise Ratio), and others.

The communication system selection section 150 makes a comparison between the data rates to select a communication system to be used, i.e., the data rate of each of the communication systems determined based on the measured quality of communication service, and the calculated required data rate. That is, as for the data rate determined for each of the communication systems in accordance with the measured quality of communication service, when there is any communication system of a data rate equal to or higher than the calculated required data rate, the communication system selection section 150 makes a selection of communication system therefrom. When there is no such communication system with the data rate being equal to or higher than the calculated required data rate, the communication system selection section 150 makes a selection of communication system from all of those. Accordingly, first of all, the data rate is checked to see whether it is satisfying the required data rate or not, and thus any communication system determined as satisfying the required data rate can be selected for use with a priority.

When any one specific communication system cannot be determined even through a comparison with the required data rate as such, the communication system selection section 150 asks the quality of communication service measurement section 140 to notify the quality of communication service of each of the communication systems to check the state of radio waves in the vicinity. Based on the quality of communication service notified as such, the communication system selection section 150 then selects any communication system considered most power efficient out of those satisfying the required data rate.

As such, if any one specific communication system cannot be determined even through a comparison between the data rates, i.e., the data rate of each of the communication systems to be determined in accordance with the measured quality of communication service, and the calculated required data rate, the communication system is selected with reference to the power consumption of each of the communication systems per traffic amount. As a result, the communication system to be used can be narrowed down with reference to the power consumption per traffic amount, and power can be saved while keeping a data rate at a required level as much as possible.

Operation of Wireless Communication Terminal

Figure 2:
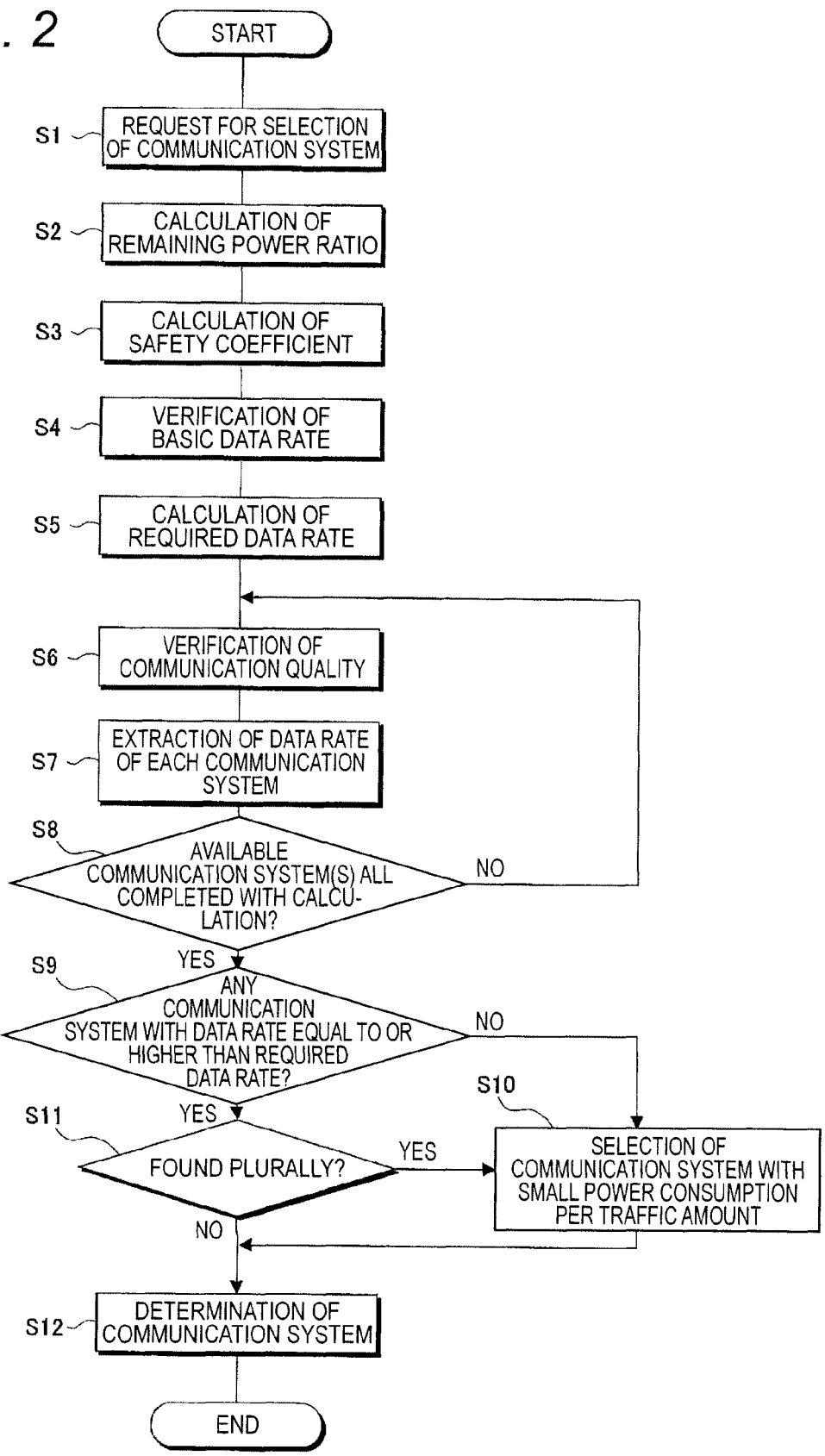
FIG. 2 is a flowchart of an operation of the wireless communication terminal of the invention.

A description will be given of the operation of the wireless communication terminal 100 configured as above. FIG. 2 is a flowchart of the operation of the wireless communication terminal 100. First of all, a request is issued to select a communication system to be used (step S1). The timing for such a request may be by a regular timer, or when a threshold value is exceeded, for example. The threshold value is set with respect to alienation of the data rate actually in use from the data rate currently available. Exemplified below is a case where a request for selecting which communication system to be used is issued at a time t.

Next, a remaining power ratio B(t) is calculated (step S2). When the power supply is stable, the remaining power ratio B(t) will be 100%. As shown in Equation 1, a safety coefficient SF is calculated using the remaining power ratio B(t) as an argument (step S3).

$$SF(t)=f(B(t))$$ [Equation 1]

Next, any set basic data rate, i.e., DRbased(t), is checked (step S4). This may be set in advance at the time of shipment of the terminal, or set by a user when the user purchases the terminal. Moreover, as will be described in an example below, the basic data rate may be revised as appropriate using a history of the data rate actually used, i.e., communication history, that is obtained during the use of the wireless communication terminal 100. The basic data rate is to be satisfied as a minimum necessity, and when the remaining power is sufficient in level, the safety coefficient described above may be multiplied thereto so that a request for the data rate can be made at a higher speed.

In such a manner, the required data rate DRreq(t) is calculated (step S5). For example, by multiplying a safety coefficient by the basic data rate using Equation 2 below, the required data rate can be calculated.

$$DR_{req}(t)=DR_{based}(t) \times SF(t)$$ [Equation 2]

Next, the quality of communication service is checked for each of the communication systems (step S6). That is, the radio waves in the vicinity are captured by any available communication system, and the quality of communication service is measured, thereby calculating the available data rate by each of the communication systems in accordance with the measured quality of communication service (step S7). The available communication systems are then each checked to see whether or not it is completed with the calculation of the data rate as such (step S8). When the communication systems available for use are not yet all completed with the calculation of the data rate, the procedure returns to step S6. When the available communication systems are all completed with the calculation of the data rate, the calculated data rates are each compared with the required data rate calculated as above to see whether or not there is any communication mode with the calculated data rate being equal to or higher than the calculated required data rate (step S9). Such calculation includes a process of extraction using the table.

When the determination result tells that there is no such communication system with the calculated data rate being equal to or higher than the required data rate, selected is any communication system with the power consumption per traffic amount being low (step S10), and the procedure goes to step S12. Note here that, to calculate the power consumption per bit in step S10, the power consumption is divided by the data rate, thereby calculating the power consumption per bit for the communication system.

On the other hand, when the determination result tells that there is any communication system with the calculated data rate being equal to or higher than the required data rate, another determination is made to see whether or not such a communication system with the calculated data rate being equal to or higher than the required data rate is found plurally (step S11).

When the determination result tells that there are a plurality of communication systems with the calculated data rate being equal to or higher than the required data rate, the procedure goes to step S10, and in step S10, any communication system with the low power consumption per traffic amount is selected, and the procedure then goes to step S12. On the other hand, when the determination result tells that there is only one communication system with the calculated data rate being equal to or higher than the required data rate, the communication system is accordingly selected for use (step S12).

As such, when there are a plurality of communication systems satisfying the required data rate, anyone of those communication systems with the power consumption per traffic amount being the lowest is selected. On the other hand, when there is no such communication system satisfying the required data rate, any communication system with the power consumption per bit being the lowest is selected from all of those communication systems. Herein, in the above process of determination, a determination factor is whether or not the calculated data rate is equal to or higher than the required data rate. Alternatively, the determination factor may be whether or not the calculated data rate is higher than the required data rate.

In the invention, the remaining level of battery of the terminal is used as a basis to set the required data rate. Because the communication system is so selected as to satisfy such a required data rate, the communication system can be used adaptively depending on the remaining level of battery, i.e., when the remaining level of battery is high, a communication system with a high data rate is selected, and when the remaining level of battery is low, be a communication system with a low data rate is selected.

First Exemplary Safety Coefficient

A description will be given of a specific example. As for a function f(B(t)) for use to calculate a safety coefficient SF(t) from a remaining power ratio B(t), a step function is a possibility such as Equation 3 below.

$$5.0 (0.7 \leq B(t))$$

$$f(B(t)) = 1.0 (0.1 \leq B(t) < 0.7)$$

$$0.1 (B(t) < 0.1) \qquad \text{[Equation 3]}$$

For a user with a basic data rate DRbased(t) of 2 [Mbps], when the remaining power ratio B(t) is 0.6 at a specific time t, f(B(t))=1.0 is established so that a required data rate DRreq(t) will be 2 Mbps.

The communication system selection section 150 manages the data rate with a correlation with the quality of communication service of each of the communication systems. FIG. 3 is a table showing a data rate and a power consumption with respect to the quality of communication service. The quality of communication service measurement section 140 checks, in advance, the state of radio waves in the vicinity for each of the communication systems. Exemplified below is a case where the wireless communication terminal 100 is located in the environment with a very low level of noise, e.g., the CINR with a communication system of EV-DO is 10 dB, and the CINR with a communication system of WiMAX is 15 dB.

In such a case, referring to FIG. 3, it can be determined that such two communication systems can keep a required data rate of 2 Mbps. With a comparison in terms of power consumption per bit, the power consumption of the communication system of WiMAX is larger in value than that of the communication system of EV-DO. As such, the communication system selection section 150 selects the communication system of EV-DO with which power saving is possible to a further degree.

When the wireless communication terminal 100 is connected with an AC (Alternating Current) power supply at a specific time t, a remaining power ratio B(t) will be 1.0. Accordingly, f(B)=5.0 is established, and the required data rate calculation section 120 calculates a required data rate DRreq(t1) as 10.0 Mbps.

At this time, exemplified is a case where the communication systems of EV-DO and WiMAX are both in the good environment with a low level of noise, i.e., the CINR with the communication system of EV-DO is 10 dB, and the CINR with the communication system of WiMAX is also 10 dB. In this case, referring to FIG. 3, it can be determined that only the communication system of WiMAX satisfies the required data rate DRreq(t1) of 10.0 Mbps, and thus the communication system selection section 150 selects the communication system of WiMAX that is ready for communication at a higher speed.

On the other hand, when the remaining power ratio B(t) is showing a large reduction at a specific time t2 due to the execution of an application on a host, for example, and when a basic data rate B(t) is 0.05, Equation 3 derives f(B(t))=0.1. Accordingly, as far as the radio wave environment is permitted, the communication system selection section 150 selects the communication system of EV-DO with which the power saving is possible for communication to a further degree.

Second Exemplary Safety Coefficient

For use as the safety coefficient, i.e., SF(t), the following function f(B(t)) is also a possibility. For example, the function f(B(t)) may be a continuous function dependent on the remaining power ratio B(t) as in Equation 4 below. Considered now is a case where the communication systems of EV-DO and WiMAX are both in the good environment with a low level of noise, i.e., the CINR of the communication system of EV-DO is 10 dB, and the CINR of the communication system of WiMAX is also 10 dB.

$$f(B(t)) = SF_{MAX} \times B(t) \qquad \text{[Equation 4]}$$

In Equation 4, $SF_{MAX}$ denotes a constant defined at an early stage, and is the maximum value of the safety coefficient. Based on Equation 4, a function f(B(t)) may be calculated at regular intervals or at any event so that the resulting required data rate will be more practical.

Exemplified now is a case where, for a user with a basic data rate DRbased(t) being 2.0[Mbps], the remaining power ratio B(t) is 0.9 at a time t when a request is issued for selection of communication system. Assuming that $SF_{MAX}$ is 5.0, the required data rate calculation section 120 calculates the required data rate DRreq(t) by the following calculation.

$$DRreq(t) = 2.0 [\text{Mbps}] \times 5.0 \times 0.9 = 9.0 [\text{Mbps}] \qquad \text{[Equation 5]}$$

At this time, by referring to the table of FIG. 3, the communication system selection section 150 finds that only the communication system of WiMAX satisfies the required data rate as above, and thus selects the communication system of WiMAX.

On the other hand, assuming that a remaining power ratio B(t1) is 0.15 at the time t1, the required data rate calculation section 120 calculates the required data rate DRreq(t) by the following equation.

$$DRreq(t1) = 2.0 [\text{Mbps}] \times 5.0 \times 0.15 = 1.5 [\text{Mbps}] \qquad \text{[Equation 6]}$$

At this time, by referring to the table of FIG. 3, the communication system selection section 150 verifies that the communication systems are all satisfying the required data rate as above, and then selects the communication system of WiMAX with the power consumption per traffic being low in value. In this case, the communication system selection section 150 verifies that the communication systems are all satisfying the required data rate, and by referring to the table in FIG. 3, selects the communication system of EV-DO.

Exemplary Basic Data Rate

Figure 4:
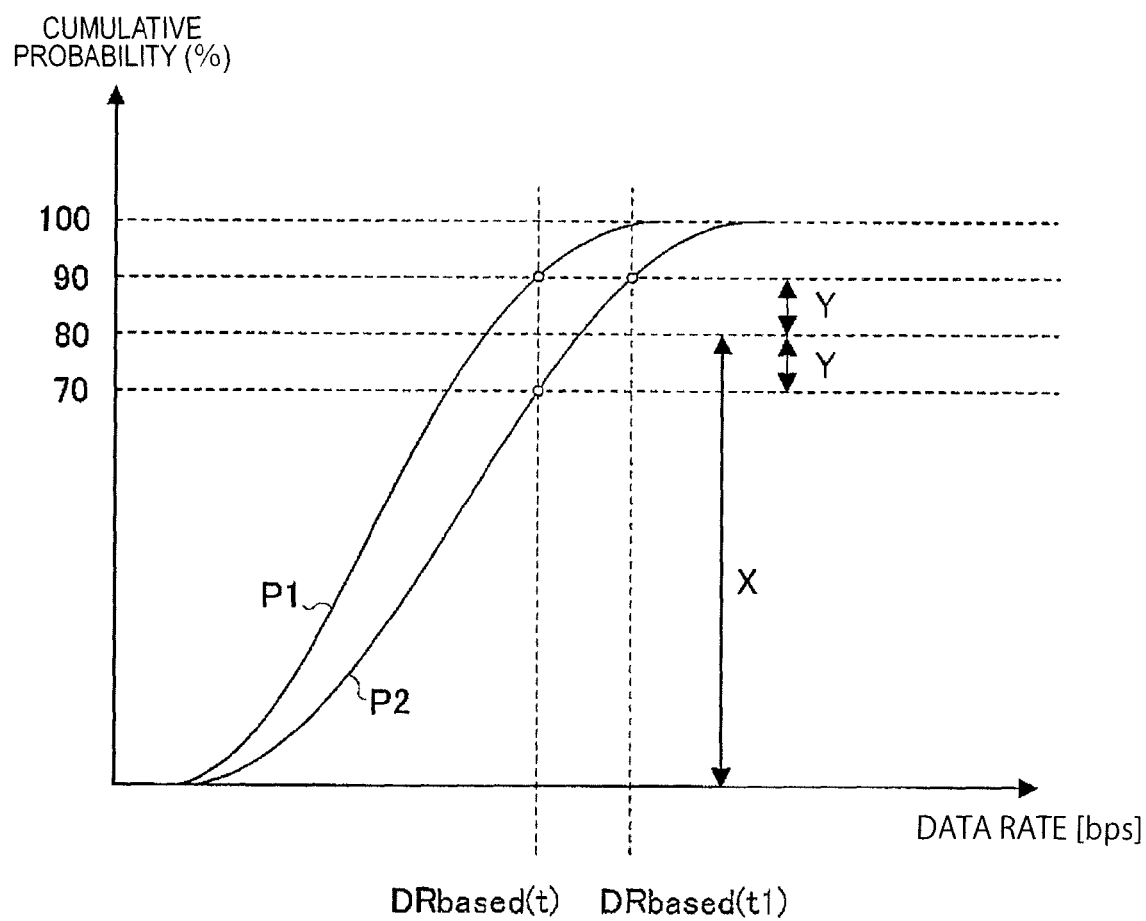
FIG. 4 is a graph showing the relationship between a data rate and a cumulative probability.

A description will be given of an exemplary operation of reflecting a communication history to a basic date rate. FIG. 4 is a graph showing an exemplary relationship between a data rate and a cumulative probability. The communication history management section 130 stores a data rate that has been actually used, and when the cumulative probability of the data rate equal to or lower than the basic data rate reaches a predetermined value or smaller, the basic data rate is revised upward. As a result, by referring to a user's history, the required data rate can be adjusted to be appropriate, thereby allowing a selection of communication system suitably for each user.

For example, when the cumulative probability with the basic data rate reaches a value of (X−Y) % or smaller, where X denotes a reference value of the cumulative probability, and Y denotes a margin, the basic data rate can be revised upward to have the cumulative probability showing a value of (X+Y) %. Also, when the cumulative probability with the basic data rate reaches a value of (X+Y) % or larger, the basic data rate can be revised downward to have the cumulative probability showing a value of (X−Y) %.

In FIG. 4, P1 denotes a cumulative probability distribution of a data rate at a time t0, and P2 denotes a cumulative probability distribution of a data rate at a time t1. The basic data rate DRbased(t0) is set to a value with which the cumulative probability takes a value of 90%, and with the lapse of time, the cumulative probability distribution shows a change, and the cumulative probability shows a value of 70% at the highest at a time t1. Assuming that the reference value X is 80%, and the margin Y is ±10%, in such a case, the basic data rate DRbased(t0) is updated to be a basic data rate DRbased (t1), and the cumulative probability thereof is so controlled as to be 80% or more being a reference value.

The invention claimed is:

1. A wireless communication terminal capable of selectively using a plurality of communication systems, the terminal comprising:
    a required data rate calculation section that calculates a required data rate as a data rate to be satisfied in accordance with a remaining level of power and a communication history; and
    a communication system selection section that makes a selection of communication system through a comparison between the data rate of each of the communication systems to be determined based on a measured quality of communication service, and the calculated required data rate.

2. The wireless communication terminal according to claim 1, wherein
    the required data rate calculation section calculates the required data rate as an increasing function of the remaining level of power.

3. The wireless communication terminal according to claim 1, wherein
    as for the data rate of each of the communication systems to be determined in accordance with the measured quality of communication service, when any of the communication systems is with the data rate equal to or higher than the calculated required data rate, the communication system selection section makes the selection of communication system therefrom.

4. The wireless communication terminal according to claim 1, wherein
    when any one of the communication systems cannot be specifically determined even through the comparison between the data rate of each of the communication systems to be determined based on the measured quality of communication service and the calculated required data rate, the communication system selection section makes the selection of communication system with reference to a power consumption per traffic amount.

5. The wireless communication terminal according to claim 1, wherein
    using a cumulative probability distribution of the data rate obtained by a user's communication history, the required data rate calculation section calculates the required data rate by referring to the data rate at any predetermined cumulative probability.

6. The wireless communication terminal according to claim 1, wherein
    the required data rate calculation section calculates the required data rate as a product of a basic data rate to beset in accordance with a user's communication history and a safety coefficient which is an increasing function of the remaining level of power.

7. A communication system selection method for selecting an optimum communication system, the method comprising:
    calculating a required data rate as the data rate to be satisfied in accordance with a remaining level of power and a communication history; and
    making a selection of communication system through a comparison between the data rate of each of the communication systems to be determined based on a measured quality of communication service, and the calculated required data rate.

8. A wireless communication terminal capable of selectively using a plurality of communication systems, the terminal comprising:
    a required data rate calculation section that calculates a required data rate as a data rate to be satisfied in accordance with a remaining level of power and a communication history; and
    a communication system selection section that, as for the data rate of each of the communication systems to be determined in accordance with the measured quality of communication service, when there is any of the communication system with the data rate equal to or higher than the calculated required data rate, selects the communication systems satisfying the condition as candidates, when there is no such communication system with the data rate equal to or higher than the calculated required data rate, selects all of available communication systems as candidates, and when any one specific communication system cannot be determined by the selection, selects a communication system from the candidates based on a power consumption per traffic amount.

9. A communication system selection method for selecting an optimum communication system, the method comprising:
    calculating a required data rate as a data rate to be satisfied in accordance with a remaining level of power and a communication history; and,
    when there is any of the communication system with the data rate equal to or higher than the calculated required data rate, selects the communication systems satisfying the condition as candidates, when there is no such communication system with the data rate equal to or higher than the calculated required data rate, selects all of available communication systems as candidates, and when any one specific communication system cannot be determined by the selection, selects a communication system from the candidates based on a power consumption per traffic amount.

* * * * *